United States Patent [19]

Neugent

[11] Patent Number: 5,011,055
[45] Date of Patent: Apr. 30, 1991

[54] BICYCLE PUMP BRACKET

[76] Inventor: John J. Neugent, 20751 Circulo Durango, Yorba Linda, Calif. 92686

[21] Appl. No.: 433,588

[22] Filed: Nov. 8, 1989

[51] Int. Cl.⁵ .............................................. B62J 7/00
[52] U.S. Cl. ...................................... 224/39; 248/229;
248/231; 211/70; 280/288.004; 224/35; 224/37;
224/32 R; 224/42.045 R
[58] Field of Search ................. 224/30 R, 30 A, 31,
224/32 R, 35, 37, 38, 39, 41, 42, 42.01, 42.41,
42.42, 42.45 R, 42.46 R; 211/60.1, 70; 248/229,
231, 222.3, 74.3, 65; 280/288.4, 304.5

[56] References Cited

U.S. PATENT DOCUMENTS

| | | | |
|---|---|---|---|
| 449,460 | 3/1891 | Bannister . | |
| 568,452 | 9/1896 | McCullum . | |
| 630,561 | 8/1899 | Reid | 224/37 |
| 853,040 | 5/1907 | Taber . | |
| 1,010,945 | 12/1911 | Olson | 224/30 R |
| 1,057,057 | 3/1913 | Hoerr . | |
| 1,058,229 | 4/1913 | Futhey | 224/39 R |
| 1,222,458 | 4/1917 | Peterson | 224/41 X |
| 1,286,103 | 11/1918 | Reed . | |
| 1,807,501 | 5/1931 | Alexander | 224/39 R |
| 1,808,328 | 6/1931 | Thomson . | |
| 1,845,365 | 2/1932 | Thomson . | |
| 2,360,767 | 10/1944 | Elmquist | 224/37 |
| 2,616,646 | 11/1952 | Matthysse | 248/65 |
| 2,942,314 | 6/1960 | Debner et al. | 24/129 |
| 3,154,275 | 10/1964 | Stewart | 248/65 |
| 3,436,108 | 4/1969 | Van Buren, Jr. . | |
| 4,039,744 | 8/1977 | Seaquist | 174/169 |
| 4,673,151 | 6/1987 | Pelz | 248/74.1 |
| 4,697,725 | 10/1987 | Miree | 224/41 |
| 4,809,890 | 3/1989 | Tsigadas | 224/32 R |

FOREIGN PATENT DOCUMENTS

| | | | |
|---|---|---|---|
| 72334 | 3/1951 | Denmark | 224/35 |
| 3103428 | 8/1982 | Fed. Rep. of Germany | 224/30 R |
| 3245133 | 6/1984 | Fed. Rep. of Germany | 224/30 R |
| 525055 | 9/1921 | France | 224/30 R |
| 1286788 | 1/1962 | France | 248/74.1 |
| 47614 | 3/1909 | Switzerland | 224/35 |

Primary Examiner—Ernest G. Cusick
Attorney, Agent, or Firm—Poms, Smith, Lande & Rose

[57] ABSTRACT

A bracket for securely attaching a bicycle pump to a tubular frame member of a bicycle comprises a base having a surface curved to fit partly around a tubular frame member and a plurality of ties extending through holes in the base for securing the base to the bicycle frame member. Hooks formed of resilient, U-shaped circularly bent strips are fixed to and extend laterally in opposite directions from sides of the base so that a bicycle pump may be placed between the hooks and twisted to snap the pump body into both of the resilient hooks, which then securely press the pump body against the bracket base and resiliently hold the pump in place.

11 Claims, 1 Drawing Sheet

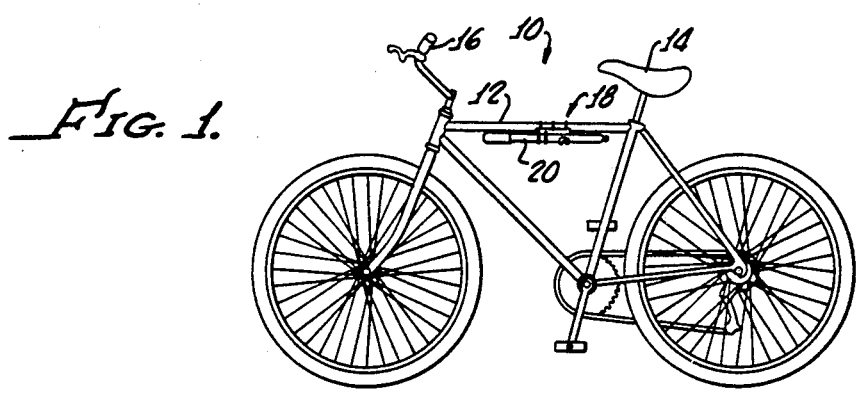
Fig. 1.
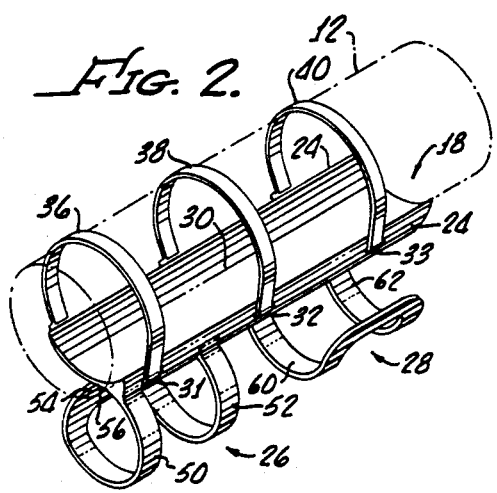
Fig. 2.
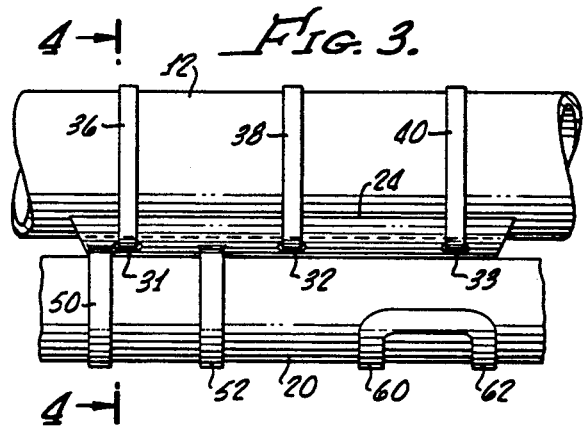
Fig. 3.
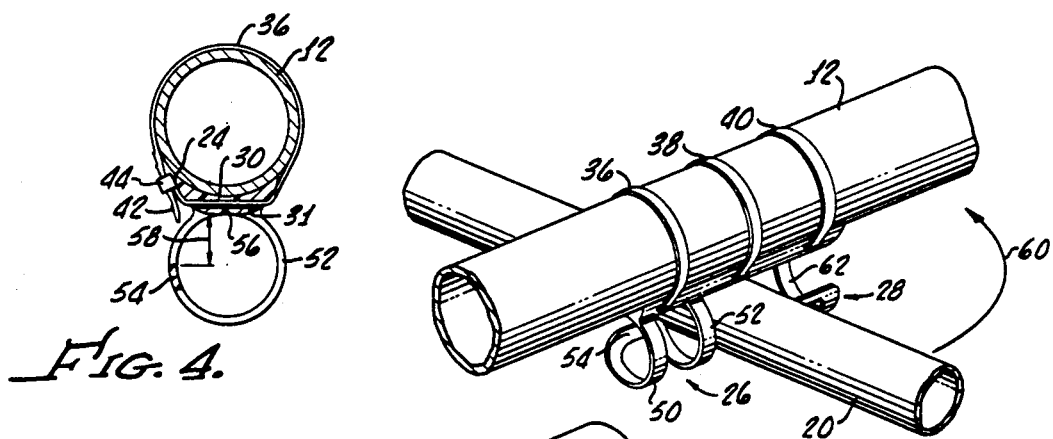
Fig. 4.
Fig. 5.
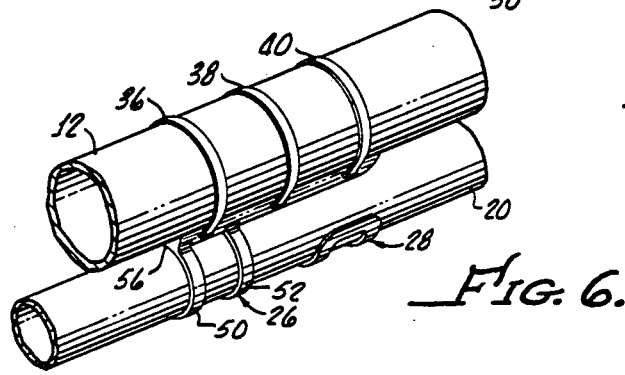
Fig. 6.

BICYCLE PUMP BRACKET

BACKGROUND OF THE INVENTION

The present invention relates to brackets for mounting a bicycle tire pump to a bicycle frame member, and more particularly concerns a bracket that is readily and firmly fixed to a bicycle and which securely locks a bicycle pump in place while permitting ready attachment and detachment of the pump from the bracket.

Various bicycle accessories, including tire pumps, are desirably carried with the rider and affixed to the bicycle frame. Generally such items as a bicycle pump are connected to the frame by means of a holder mechanism that is bolted to the frame and has portions that can extend completely around the cylindrical pump body. Frequently some type of fastener, such as a bolt or other threaded member, is employed to attach the holder to the bicycle frame, and a manually operable fastener is employed to attach the pump body to the holder itself.

Particularly for a type of bicycle, including that known as a mountain bike, that is designed for use over rough terrain, vibration to which the pump holder and pump is subjected make common clip type holders unreliable. This is because vibration experienced in rough terrain may shake the pump and dislodge it from the holder, unless separate locking fasteners are used to securely fix the pump to the holder. The use of such fasteners is undesirable, apart from the high cost, in that additional time and effort is required in attaching and detaching the pump from the holder because of the need to manipulate the fasteners. Furthermore, unless securely attached, such fasteners may be easily misplaced or lost. Presently known holder arrangements that do not employ fasteners for securing the pump to the holder do not provide a sufficiently firm attachment of the pump to the holder to ensure against accidentally dislodging the pump.

Accordingly, it is an object of the present invention to provide a bicycle pump bracket for holding a pump to a bicycle tubular frame member, which bracket avoids or minimizes above mentioned problems.

SUMMARY OF THE INVENTION

In carrying out principles of the present invention in accordance with a preferred embodiment thereof, a bicycle pump bracket for detachably securing an elongated cylindrical bicycle pump body to a bicycle tubular frame member includes an elongated bracket base having an outer surface concavely curved to fit a tubular frame member of a bicycle. First and second curved resilient hooks are fixed to and project from a side of the base in mutually opposite directions, extending transversely of the length of the elongated base. The curved resilient hooks are configured and arranged to hold a bicycle pump body and press it tightly against the outer side of the base when the pump body is received within the hooks. The pump body is forced into and securely engaged within both of the hooks by positioning the pump body between the hooks, extending transversely of the base, and then twisting the pump body to force the pump body into the hook openings to snugly receive and resiliently press against the pump body.

BRIEF DESCRIPTION OF THE DRAWINGS

FIG. 1 illustrates a bicycle with a pump and pump bracket embodying principles of the present invention attached to a tubular frame member;

FIG. 2 is a pictorial illustration of the pump bracket of FIG. 1;

FIG. 3 is a side elevational view of the bracket of FIG. 2 attached to a bicycle frame member and having a pump attached;

FIG. 4 is a section taken on line 4—4 of FIG. 4;

FIG. 5 illustrates the pump in a first position with respect to the bracket in preparation for twisting the pump to insert it into the bracket; and FIG. 6 illustrates the pump securely engaged to and within the bracket hooks.

DETAILED DESCRIPTION OF THE INVENTION

As illustrated in FIG. 1, a bicycle 10 is formed with a conventional frame made of rigid tubular members, including an upper horizontal tubular member 12 extending between the bicycle seat 14 and handle bars 16. A bracket generally indicated at 18 is secured to the underside of the upper horizontal bicycle tubular frame member 12 and carries a bicycle pump which has an elongated cylindrical pump body 20. Although the bracket 18 is illustrated as being secured to the upper horizontal tubular frame member 12, it will be readily understood that the bracket may also be attached to one of the other frame members of the bicycle as may be deemed necessary or desirable.

As shown in FIGS. 2, 3 and 4, the bracket 18 includes an elongated base 24 and first and second resilient hooks 26,28. Base member 24 is elongated and having a length that may be three or four times the diameter of the tubular frame member of the bicycle. An inner surface 30 of the base is concavely curved about an axis parallel to its longitudinal extent, having a transverse cross section forming a portion of a circular arc of which the diameter is substantially equal to the outside diameter of the conventional bicycle tubular frame member 12. Thus the surface 30 can snugly fit along and against the exterior surface of the tubular frame member. Preferably the circular extent of the base 24, as viewed in cross section (as seen in FIG. 4, for example), is less than 180° so that the base will extend less than half way around the bicycle frame member. The base cross section should have a circular extent of a sufficiently broad area of engagement between the base and the frame member. It is presently preferred to make the base with a circular extent of about 90°.

A plurality of longitudinally spaced holes 31,32 and 33 extend transversely through the base between its inner and outer surfaces and respectively receive tie members 36,38,40 which extend through the holes of the base member and around the tubular frame member 12, to which they are firmly and securely attached.

It will be readily appreciated that many types of ties may be used. At present it is preferred to use a type of tie commonly used for bundling electrical wires. Such a tie has a good portion of its length, including at least an end portion, formed with rearwardly pointing serrations or teeth 42 (FIG. 4), so that the end of the tie when inserted through a loop 44 near the other end may be pulled tight and securely and tightly fixed around the periphery of the bicycle tubular frame member. It is also contemplated that other means of attaching the base to the frame member may be used, including but not limited to bolts, clamps and the like.

The two hooks 26,28 are identical to one another, although oppositely disposed and mutually spaced, so that a description of one will suffice f both. Hook is formed of a resilient continuous U-shaped rod or strip having first and second legs 50,52 interconnected by a bight 54. The outer ends of the spaced legs 50,52 are fixedly secured to a side of bracket base 24 adjacent one end of the bracket and the two legs are bent about an axis parallel to the longitudinal extent of the base, as illustrated in the drawings, to form the circularly curved resilient hook 26, which opens laterally outwardly (toward the left, as viewed in FIG. 4) from one side of the base. The curvature of legs 50,52 positions the bight 54 so that it is cooperates with the outer surface 56 of the base 24 to form a transversely and outwardly facing opening that has a length, denoted at 58 in FIG. 4, slightly less than the exterior diameter of the pump body. The hook opening lies in a transverse plane substantially perpendicular to the axis of curvature of the base surface 30 and opens laterally of the base.

The hook 28 is substantially identical to hook 26, except, of course, that its legs 60,62 are secured to the base at the other end of the base, and, further, are curved oppositely, but about the same axis as hook 26, so that the hook opens laterally of the base in the direction opposite the direction of the opening of hook 26.

It is presently preferred to mold the entire bracket, as an integral body (including the base and both hooks), of a suitable rigid and resilient plastic material, as by injection molding or equivalent process.

In use, the bracket base is placed against the underside of the bicycle tubular frame member, such as frame member 12, as shown in FIG. 1, with the ties 36,38,40 extending through the respective base apertures 31,32 and 33. The ties tightly encircle the bicycle frame member and go through the base, having their ends affixed to one another to tightly fix the base to the underside of the frame member 12. Then the pump body 20 is positioned (as shown in FIG. 5) at or against the outer side of the base 24 between the two hooks, with the axis of the pump extending substantially perpendicular or transverse to the longitudinal extent of the base 24 and bicycle tubular frame member 12. The pump body then is twisted about an axis perpendicular to the longitudinal extent of the base, in the direction of arrow 60, to cause the circularly cylindrical pump body to resiliently cam the hook ends 54 downwardly and to thereby enlarge the openings of both of the hooks so as to allow the pump body to enter into the curved hooks. Thereupon the bights of the hooks resiliently snap over the pump body within the hooks and as it enters the hooks and firmly press the pump body against the base to securely lock the pump to the bracket and to the bicycle. To ensure secure engagement of the pump body within the hooks, the latter have a diameter, in unstressed condition, that is slightly less than the diameter of the pump body exterior. Thus the hooks are resiliently displaced slightly outwardly by the encircled pump and continuously and tightly press against the pump to hold it tightly in place. The pump is removed by the opposite motion, that is, by grasping the pump body and twisting it in the opposite direction about an axis perpendicular to the longitudinal extent of the base, to forcibly and resiliently enlarge the openings of the two hooks, thereby snapping the pump body out of the hooks and freeing the pump from the bracket.

It will be seen that there has been described a bicycle pump bracket that is uniquely adapted for simple, firm and stable attachment to a bicycle tubular frame member, and which allows easy manual attachment or detachment of the pump to and from the bracket without the use of any tools or fasteners, and yet will firmly and securely affix the pump to the bicycle.

I claim:

1. A bicycle pump bracket for detachably securing an elongated cylindrical bicycle pump body to a bicycle tubular frame member, said bracket comprising:

an elongated base having an inner surface concavely curved about a firs axis and adapted to fit a tubular frame member of a bicycle, first and second hooks fixed to and projecting from an outer side of said base, said hooks being mutually spaced along the length of said base, said first hook having an opening lying in a transverse plane substantially perpendicular to said first axis and opening laterally of said base in a first direction, said second hook having an opening lying in a plane substantially parallel to and spaced from said transverse plane, and opening laterally of said base in a second direction opposite said first direction, each said hook being formed of a continuous U-shaped rod having ends fixed to said base and having a bight defining one side of the hook opening.

2. The bracket of claim 1 wherein said U-shaped rods are made of a resilient material, and wherein said hook openings are slightly smaller than the diameter of a bicycle pump to be secured thereto, whereby the cylindrical body 9 of a bicycle pump may be forced into and securely engaged within both said hooks by positioning the pump body between the hooks transversely of the base and twisting the pump body about an axis perpendicular to said first mentioned axis and parallel to said planes, thereby forcibly spreading the opening of said hooks and causing the hook bight portions to resiliently close over the pump body after it is received within the hooks.

3. The bracket of claim 1 wherein said hooks are formed with a circular curvature that is slightly greater than the curvature of a bicycle pump to be held therein, whereby the hooks are adapted to be resiliently displaced slightly outwardly by a bicycle pump held thereby.

4. The bracket of claim 1 including means for fixedly attaching said base to said tubular frame member.

5. The bracket of claim 4 wherein said means for attaching comprises a plurality of holes extending through the base, and a plurality of tie means extending through said plurality of holes and configured and arranged to be secured to and around a tubular frame member of a bicycle.

6. The bracket of claim 4 wherein said concavely curved surface of said base has a transverse cross section that forms only a small part of a circle.

7. A bicycle pump bracket for detachably securing an elongated cylindrical bicycle pump body to a bicycle tubular frame member, said bracket comprising:

an elongated base having an inner surface concavely curved about a first axis and adapted to fit a tubular frame member of a bicycle, and first and second hooks fixed to and projecting from an outer side of said base, said hooks being mutually spaced along the length of said base and opening laterally in opposite directions extending transversely of said first axis, each said hook comprising a curved resilient member fixed at one end to said base and having a free end, said free end of each hook cooperating with a side of said base to define a hook opening between such free end and base that is slightly smaller than the external diameter of a bicycle pump to be received therein, said hooks being configured and arranged to hold a bicycle pump body and press it tightly against the outer side of said base when the pump body is received within said hooks, whereby the cylindrical body of a bicycle pump may be forced into and securely engaged within both said hooks by positioning the pump body between the hooks transversely of the base and twisting the pump body about an axis perpendicular to said first mentioned axis an parallel to said planes, thereby forcibly displacing the hook free ends from the base to enable the hook free ends to resiliently snap over the pump body after it is received within the hooks and to press the pump body to hold it tightly in place.

8. The bracket of claim 7 wherein each said hook is formed of a continuous U-shaped resilient strip having first and second legs interconnected by a bight, outer ends of said legs being fixed to said base, said legs being curved in transverse planes perpendicular to said first axis, said strip bights forming the free end of each hook.

9. The bracket of claim 8 wherein said legs, in unstressed condition, define an arc of a bicycle having a diameter less than the diameter of the outside of a bicycle pump, whereby said hooks are adapted to be resiliently enlarged by receiving a pump and resiliently hold such pump tightly with the hooks.

10. The bracket of claim 9 including means on the base for attaching the base to a bicycle tubular frame member.

11. The bracket of claim 10 wherein said means for attaching the base comprises a plurality of holes extending through the base, and a plurality of tie means extending through said plurality of holes, said tie means being configured and arranged to be secured to and around the tubular frame member of the bicycle.

* * * * *